United States Patent
Arakawa

(10) Patent No.: US 12,255,890 B2
(45) Date of Patent: *Mar. 18, 2025

(54) BIOMETRIC AUTHENTICATION DEVICE, BIOMETRIC AUTHENTICATION SYSTEM, BIOMETRIC AUTHENTICATION METHOD AND RECORDING MEDIUM

(71) Applicant: NEC Corporation, Tokyo (JP)

(72) Inventor: Takayuki Arakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

This patent is subject to a terminal disclaimer.

(21) Appl. No.: 17/848,647

(22) Filed: Jun. 24, 2022

(65) Prior Publication Data

US 2022/0329590 A1    Oct. 13, 2022

Related U.S. Application Data

(63) Continuation of application No. 16/758,223, filed as application No. PCT/JP2018/039749 on Oct. 25, 2018, now Pat. No. 11,405,388.

(30) Foreign Application Priority Data

Oct. 25, 2017    (JP) ................ 2017-206243

(51) Int. Cl.
H04L 9/40    (2022.01)
(52) U.S. Cl.
CPC ............... H04L 63/0861 (2013.01)
(58) Field of Classification Search
None
See application file for complete search history.

(56) References Cited

U.S. PATENT DOCUMENTS 10,977,349 B2 *  4/2021  Suh ............... A61B 5/318
2003/0139654 A1   7/2003  Kim et al.
(Continued)

FOREIGN PATENT DOCUMENTS

EP    2434423 A1    3/2012
EP    2696615 A1    2/2014
(Continued)

OTHER PUBLICATIONS

Li et al., "An Approach to Biometric Verification Based on Human Body Communication in Wearable Devices", Shenzhen Institutes of Advanced Technology, Chinese Academy of Science, PMCID: PMC5298698, doi: 10.3390/s17010125, PMID: 28075375, 1/17, (Year: 2017).*

(Continued)

*Primary Examiner* — Piotr Poltorak
(74) *Attorney, Agent, or Firm* — Sughrue Mion, PLLC

(57)    ABSTRACT

The present invention reduces the risk of user biometric information being leaked to a third party. A biometric authentication device (820) receives an echo signal (response signal) from a client device. The echo signal is formed as a result of an inspection signal being applied to an authentication subject by a client device, and the inspection signal being transmitted into the body or to the surface of the body of the authentication subject and changing into the echo signal. The biometric authentication device (820) comprises: an inspection signal generation unit (821) that generates the same inspection signal as the client device; a transmission characteristic calculation unit (823) that calculates, from the inspection signal and the echo signal, a transmission characteristic of the authentication subject; and an authentication unit (824) that authenticates the authentication subject by comparing a preregistered first transmis- (Continued)

sion characteristic and a calculated second transmission characteristic.

6 Claims, 13 Drawing Sheets

(56) References Cited

U.S. PATENT DOCUMENTS

| | | | |
|---|---|---|---|
| 2010/0328033 A1 | 12/2010 | Kamei | |
| 2011/0314530 A1* | 12/2011 | Donaldson | H04L 9/3231 726/7 |
| 2012/0005736 A1 | 1/2012 | Takahashi et al. | |
| 2012/0079579 A1 | 3/2012 | Kamakura | |
| 2014/0047565 A1 | 2/2014 | Baek et al. | |
| 2014/0316771 A1* | 10/2014 | Short | G01S 3/8006 704/201 |
| 2018/0307818 A1 | 10/2018 | Yano et al. | |
| 2019/0370444 A1* | 12/2019 | Jeong | G06F 21/45 |

FOREIGN PATENT DOCUMENTS

| | | |
|---|---|---|
| EP | 3160106 A1 | 4/2017 |
| JP | 2004-000474 A | 1/2004 |
| JP | 2010-146245 A | 7/2010 |
| JP | 2012-069025 A | 4/2012 |
| JP | 2014-036438 A | 2/2014 |
| WO | 2009/104437 A1 | 8/2009 |
| WO | 2017/069118 A1 | 4/2017 |

OTHER PUBLICATIONS

Isla et al., "Heartbeat Biometrics for Remote Authentication Using Sensor Embedded Computing Devices", International Journal of Distributed Sensor Networks, vol. 2015, Article ID 549134, (Year: 2015).*

Foudil Belhadj, "Biometric system for identification and authentication", Computer Vision and Pattern Recognition [cs.CV]. Ecole nationale Supérieure en Informatique Alger, 2017 (Year: 2017).*

International Search Report for PCT Application No. PCT/JP2016/039749, mailed on Dec. 25, 2016.

English translation of Written opinion for PCT Application No. PCT/JP2018/039749, mailed on Dec. 25, 2018.

Extended European Search Report for EP Application No. EP18871109.7 dated on Nov. 11, 2020.

* cited by examiner

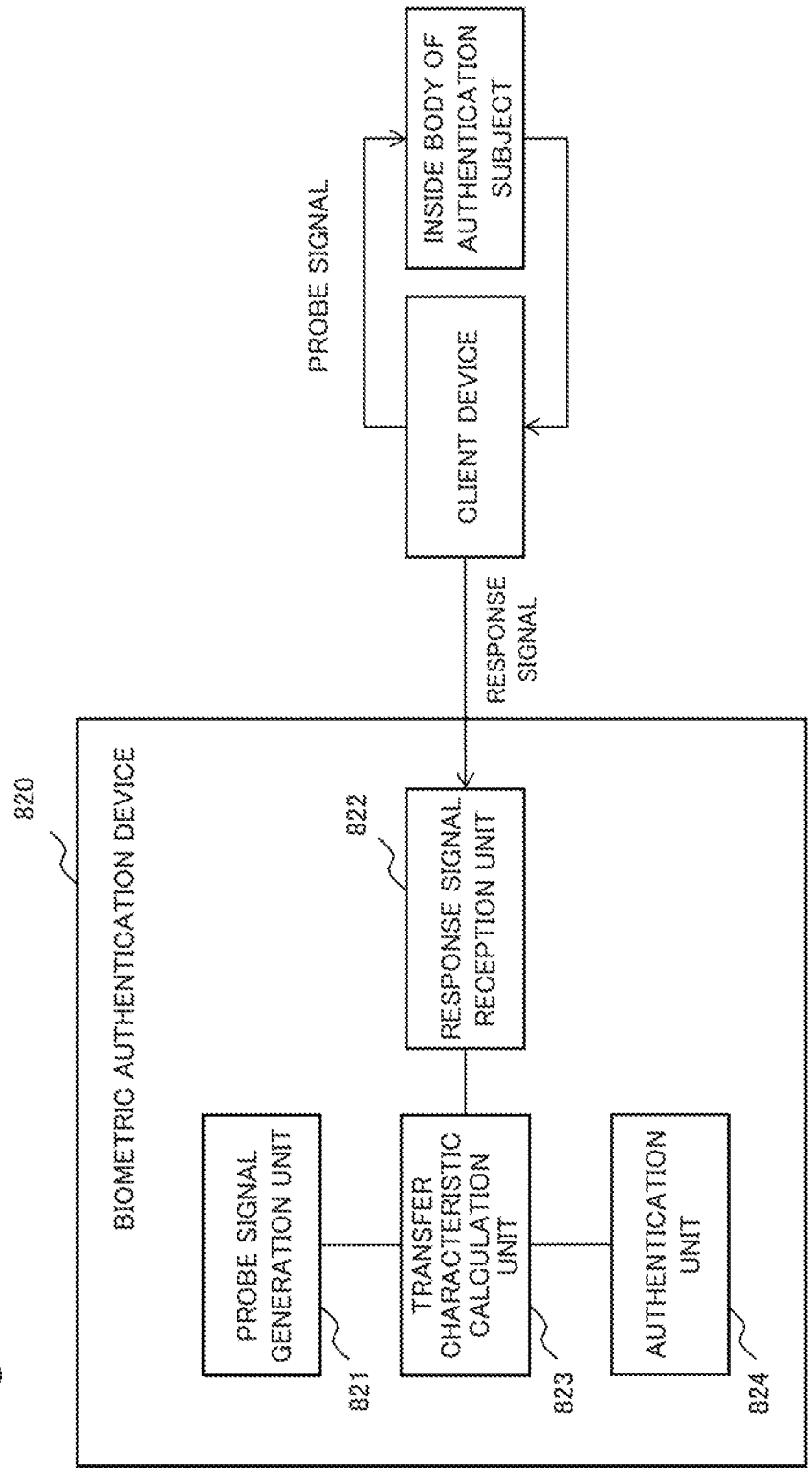

BIOMETRIC AUTHENTICATION DEVICE, BIOMETRIC AUTHENTICATION SYSTEM, BIOMETRIC AUTHENTICATION METHOD AND RECORDING MEDIUM

CROSS-REFERENCE TO RELATED APPLICATIONS

The present application is a continuation application of U.S. patent application Ser. No. 16/758,223 filed on Apr. 22, 2020, which is a National Stage Entry of international application PCT/JP2018/039749 filed on Oct. 25, 2018, which claims the benefit of priority from Japanese Patent Application No. 2017-206243 filed on Oct. 25, 2017, the disclosures of all of which are incorporated in their entirety by reference herein.

TECHNICAL FIELD

The present disclosure relates to a biometric authentication device, a biometric authentication system, a biometric authentication method, and a recording medium, and relates to a biometric authentication system that authenticates a person by using an audio device, for example.

BACKGROUND ART

Biometric authentication is a method of personal authentication, based on biometric information such as a fingerprint, an iris, and a voice print. The biometric authentication has an advantage over personal authentication using an ID card and a password, that "there is no possibility to lose (a card)" and "there is no need to remember (a password)".

In the biometric authentication, a client device acquires biometric information from a user (authentication subject), and transmits the acquired biometric information to an authentication server via a network. The authentication server performs personal authentication, based on the biometric information received from the client device. Therefore, there is a risk that the biometric information is sniffed or a malicious third party intrudes the authentication server and steals the biometric information, on a network. The sniffing herein means that a third party surreptitiously see data by monitoring a packet flowing on the network. These risks result in leakage of the biometric information being personal information.

In order to overcome the related problem of the biometric authentication described above, PTL 1 discloses a biometric authentication system using a one-time parameter. The related biometric authentication system disclosed in PTL 1 includes a parameter server in addition to the client device and the authentication server.

The parameter server generates the one-time parameter, and transmits the generated parameter to the authentication server and the client device.

The client device acquires biometric information of a user by using a sensor, and converts a feature value included in the acquired biometric information, by the parameter received from the parameter server. The client device transmits, to the authentication server, the converted feature value and an ID input by the user.

The authentication server stores registered biometric information (template) and the ID in association with each other. The authentication server converts the template associated with the ID input by the user, by using the parameter received from the parameter server. Then, the authentication server performs biometric authentication by comparing the converted feature value received from the client device with the template converted by using the parameter.

In the related biometric authentication described in PTL 1, the converted feature value is transmitted from the client device to the authentication server. Therefore, even when a third party sniffs the converted feature value to be output from the client device, on a network, it is difficult to restore the biometric information from the converted feature value. The authentication server stores the template acquired by converting the feature value included in the biometric information. Therefore, even when a third party intrudes the authentication server, it is difficult to acquire the biometric information itself. Further, the parameter server automatically generates the one-time parameter, and thus the related biometric authentication also has the advantages of the biometric authentication such as "there is no possibility to lose (a card)" and "there is no need to remember (a password)".

CITATION LIST

Patent Literature

[PTL 1] Japanese Unexamined Patent Application Publication No. 2010-146245
[PTL 2] Japanese Unexamined Patent Application Publication No. 2004-000474
[PTL 3] International Publication No. WO2009/104437

SUMMARY OF INVENTION

Technical Problem

In the related biometric authentication system described in PTL 1, when a third party can simultaneously sniff both of input/output into/from the client device, specifically, both of the one-time parameter (input) generated in the parameter server and the feature value (output) converted by the one-time parameter in the client device, there is a risk that the original biometric information is restored from the input/output.

The present disclosure has been made in view of the above-described issues, and an object of the present disclosure is to reduce a risk of leakage of user biometric information to a third party.

Solution to Problem

A biometric authentication device according to one aspect of the present disclosure includes a response signal reception unit that receives a response signal from a client device, the response signal being a signal in which a probe signal changed by being transmitted through a body or on a surface of the body of an authentication subject, the probe signal being a signal applied to the authentication subject by the client device; a probe signal generation unit that generates a same probe signal as the probe signal applied by the client device; a transfer characteristic calculation unit that calculates a transfer characteristic of the authentication subject using the probe signal being generated by the probe signal generation unit and the response signal; and an authentication unit that authenticates the authentication subject by comparing a previously registered transfer characteristic and the transfer characteristic calculated by the transfer characteristic calculation unit.

A biometric authentication system according to one aspect of the present disclosure is a biometric authentication system including the biometric authentication device and the client device that includes a probe signal replay unit that replays the probe signal and outputting the replayed probe signal toward the authentication subject; a response signal measurement unit that measures the response signal from the authentication subject; and a response signal transmission unit that transmits the response signal measured by the response signal measurement unit to the biometric authentication device, the response signal transmitted by the response signal transmission unit being receiving by the response signal reception means of the biometric authentication device.

A biometric authentication method according to one aspect of the present disclosure is a biometric authentication method to be performed by a biometric authentication device, comprising: receiving a response signal from a client device, the response signal being a signal in which a probe signal changed by being transmitted through a body or on a surface of the body of an authentication subject, the probe signal being a signal applied to the authentication subject by the client device; generating the same probe signal as the probe signal applied by the client device; calculating a transfer characteristic of the authentication subject using the generated probe signal and the response signal; and authenticating the authentication subject by comparing a previously registered transfer characteristic and the calculated transfer characteristic.

A recording medium according to one aspect of the present disclosure is a recording medium that stores a biometric authentication program for a computer included in a biometric authentication device, wherein the biometric authentication device receives a response signal from a client device and the response signal is a signal in which a probe signal changed by being transmitted through a body or on a surface of the body of the authentication subject, the probe signal being a signal applied to the authentication subject by the client device, and the biometric authentication program causes the computer to execute generating the same probe signal as the probe signal applied by the client device, calculating a transfer characteristic of the authentication subject using the generated probe signal and the response signal, and authenticating the authentication subject by comparing a previously registered transfer characteristic and the calculated transfer characteristic.

Advantageous Effects of Invention

One aspect of the present disclosure is able to reduce a risk of leakage of user biometric information to a third party.

BRIEF DESCRIPTION OF DRAWINGS

FIG. 13 is a block diagram illustrating a configuration of a biometric authentication system according to an eighth example embodiment of the present disclosure.

EXAMPLE EMBODIMENT

First Example Embodiment

One example embodiment of the present disclosure is described by using FIGS. 1 to 5.
(Configuration of Personal Authentication Device 1)

Figure 1:
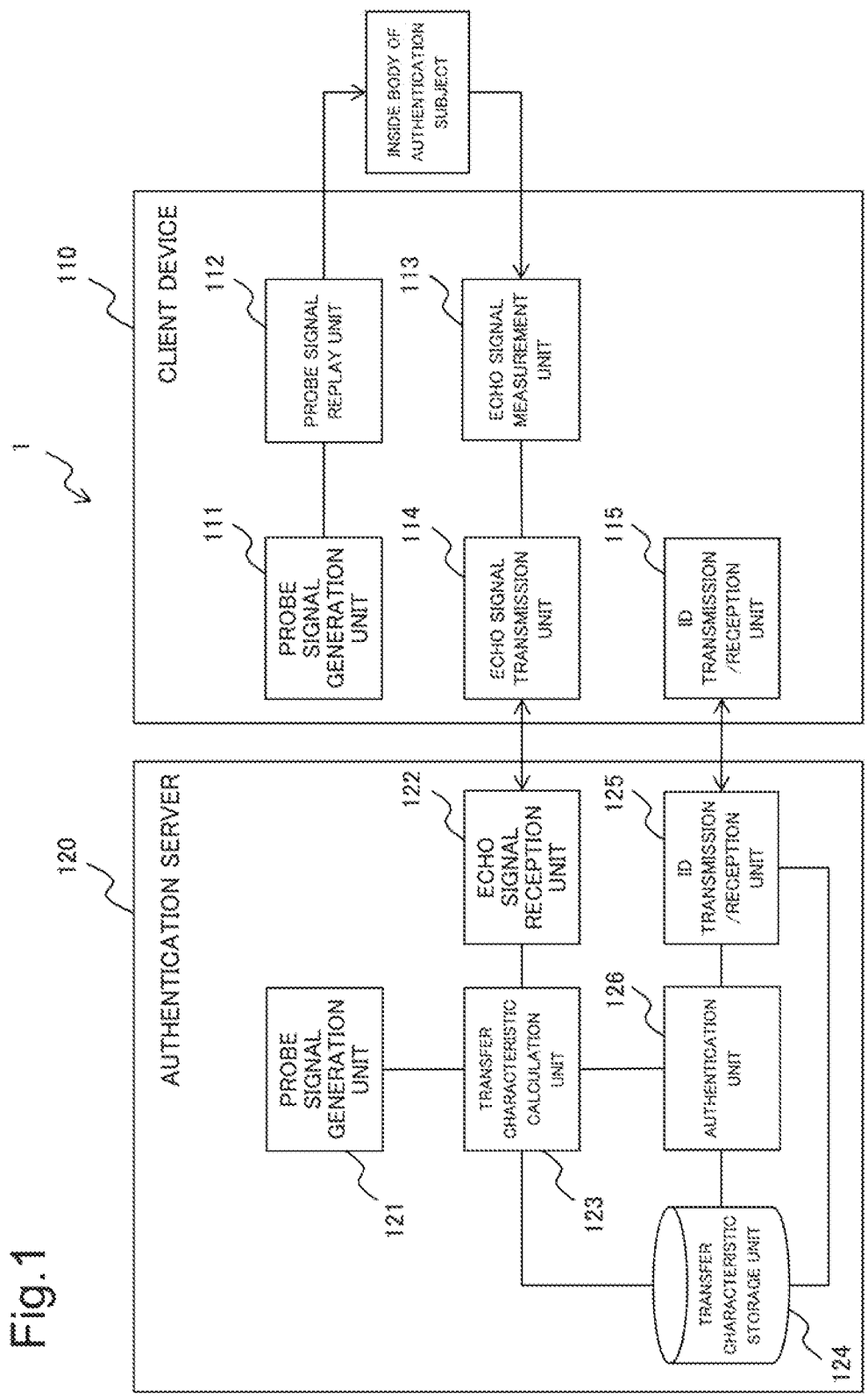
FIG. 1 is a block diagram illustrating a configuration of a biometric authentication system according to a first example embodiment of the present disclosure.

FIG. 1 is a block diagram illustrating a configuration of a personal authentication system 1 according to the present example embodiment. With reference to FIG. 1, the personal authentication device 1 includes a client device 110 and an authentication server 120. The authentication server 120 is a biometric authentication device according to one aspect of the present disclosure.

The client device 110 includes a probe signal generation unit 111, a probe signal replay unit 112, an echo signal measurement unit 113, an echo signal transmission unit 114, and an ID transmission/reception unit 115.

The authentication server 120 includes a probe signal generation unit 121, an echo signal reception unit 122, a transfer characteristic calculation unit 123, a transfer characteristic storage unit 124, an ID transmission/reception unit 125, and an authentication unit 126.

Processing executed by each unit of the client device 110 and the authentication server 120 is described later in the description of an operation flow.
(Operation Flow at Time of Registration)

Figure 2:
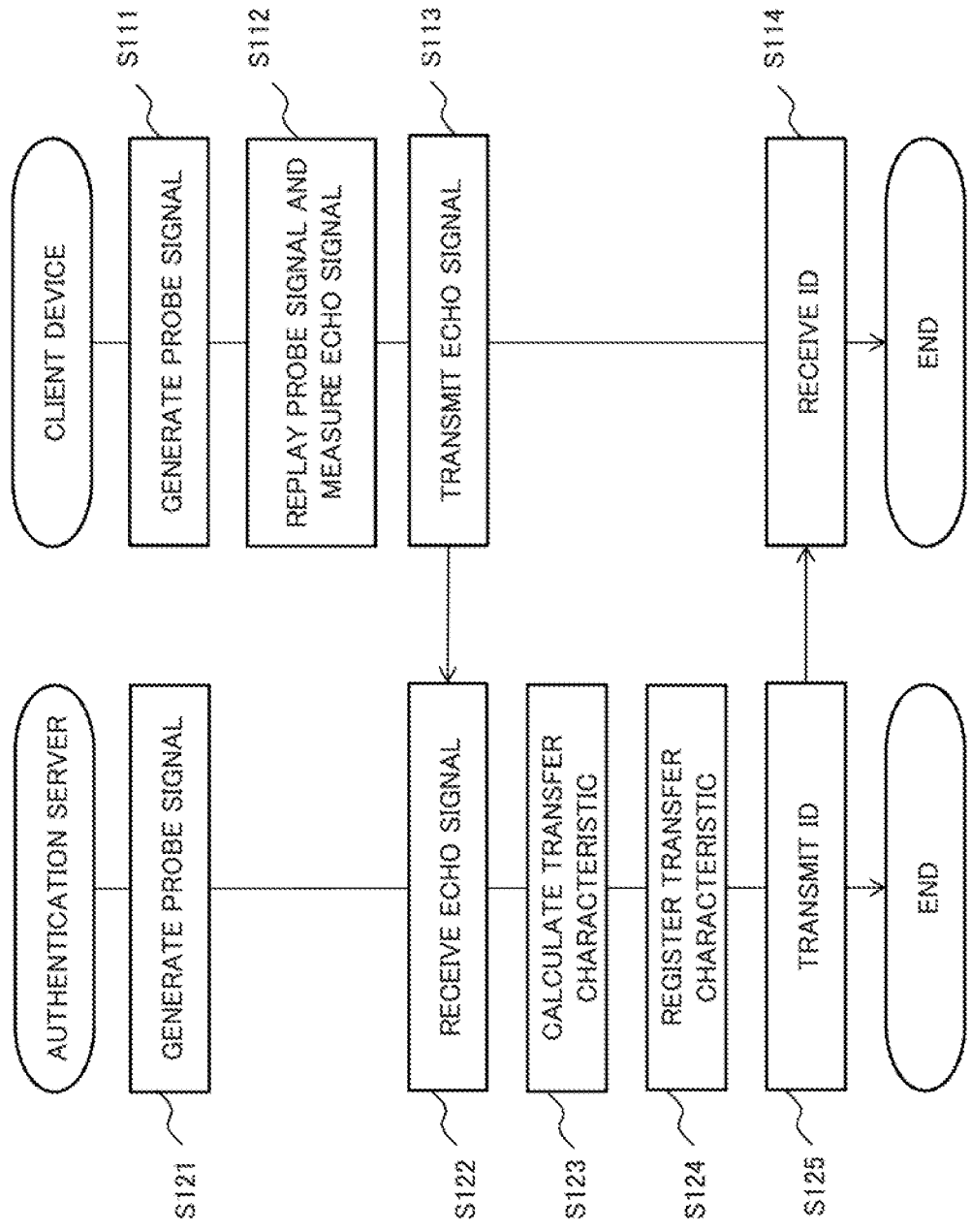
FIG. 2 is a flowchart illustrating a processing flow at a time of registration in the biometric authentication system according to the first example embodiment of the present disclosure.

With reference to FIG. 2, an operation flow of the client device 110 and the authentication server 120 at a time of registering biometric information of a user (registration subject) is described.

The trigger for starting the operation may be provided on the side of the client device 110 by a user operation, or may be provided from the authentication server 120.

As illustrated in FIG. 2, the probe signal generation unit 111 in the client device 110 generates a probe signal (step S111). The probe signal generation unit 121 in the authentication server 120 also generates, independently of the client device 110, the same probe signal as the probe signal generated by the probe signal generation unit 111 (step S121).

It is preferable that the probe signal generation unit 111 and the probe signal generation unit 121 generate the probe signal as different as possible for each registration (or authentication described later). For example, the client device 110 and the authentication server 120 have a common table of random numbers in advance. The probe signal is associated with a seed code or a random number in advance. The probe signal generation unit 111 and the probe signal generation unit 121 may generate a common probe signal, based on the table of random numbers and time information. Alternatively, one of the probe signal generation unit 111 and the probe signal generation unit 121 issues a seed code for generating the probe signal, and transmits the seed code to the other. Then, the client device 110 and the authentication server 120 may read the random number at the position of the table of random numbers indicated by the common seed code, and generate the same probe signal associated with the read random number. Alternatively, the probe signal generation unit 111 and the probe signal generation unit 121 can generate different probe signals by changing the seed code or the table of random numbers for each registration (or authentication described later) of biometric information. When the type of the probe signal is finite, it is preferable that a same type of the probe signal is repeatedly generated with a sufficiently long period. Examples of some types (patterns) of the probe signal are described later.

After step S111, the probe signal replay unit 112 replays the probe signal generated by the probe signal generation unit 111, and applies the probe signal into the body or to the surface of the body of the user. Then, the echo signal measurement unit 113 measures an echo signal into which the probe signal changes (or echoes) by being transmitted through the user's body or on the surface of the user's body (step S112). The "echo signal" according to the present example embodiment includes not only sound but also voltage, light or the like. In other words, the echo signal measurement unit 113 measures, more broadly, a response of the user's body to the probe signal. In the present disclosure, "echo signal" is also called "response signal".

A detail of step S112 is described with some examples.

In a first example, the probe signal to be replayed by the probe signal replay unit 112 is a sound signal. The client device 110 has a shape (such as an earphone) wearable on the ear by a user. First, the probe signal replay unit 112 performs digital-analogue conversion (DA conversion) on the probe signal from the probe signal generation unit 111. Next, the probe signal replay unit 112 outputs the probe signal toward the user's ear canal by using a speaker (not illustrated) included in the client device 110. The probe signal generates an echo signal by being transmitted through the user's ear canal.

The echo signal measurement unit 113 records the echo signal from the ear canal by using a microphone directed to the user's ear canal. The echo signal measurement unit 113 performs analogue to digital conversion (AD conversion) on the recorded echo signal, and transmits the AD converted echo signal to the echo signal transmission unit 114.

In a second example, the probe signal replay unit 112 uses ultrasound as a probe signal. The probe signal replay unit 112 outputs the probe signal toward a user. The echo signal measurement unit 113 receives an echo signal generated by the probe signal being transmitted through the user's body or on the surface of the user's body.

In a third example, the probe signal replay unit 112 applies voltage (probe signal) between two sites on the skin surface of a user. The echo signal measurement unit 113 measures current flowing between these two sites. A method for measuring skin conductance response from current flowing on a skin surface is disclosed in PTL 2, for example.

After step S112, the echo signal transmission unit 114 transmits, to the authentication server 120, the echo signal measured by the echo signal measurement unit 113 (step S113).

The echo signal reception unit 122 in the authentication server 120 receives the echo signal from the client device 110 (step S122).

Next, the transfer characteristic calculation unit 123 calculates a transfer characteristic of the body of the user from the probe signal generated by the probe signal generation unit 121 and the echo signal received by the echo signal reception unit 122 (step S123). The transfer characteristic calculation unit 123 may calculate the transfer characteristic by a method to be described below, for example.

A transfer characteristic $G(m)$ is calculated by the following (Equation 1) or (Equation 2). In (Equation 1) and (Equation 2), $X(m)$ is a complex spectrogram acquired by performing Fourier transform on a time waveform of the probe signal, and $Y(m)$ is a complex spectrogram acquired by performing the Fourier transform on a time waveform of the echo signal.

$$G(m) = \frac{Y(m)}{X(m)} \tag{Equation 1}$$

or $$G(m) = \frac{X^*(m) \cdot Y(m)}{|X(m)|^2} \tag{Equation 2}$$

In (Equation 1) and (Equation 2), m is an index of a frequency band. (Equation 1) and (Equation 2) are calculated for each frequency band m. In (Equation 2), "*" indicates a complex conjugate. "·" indicates a product of complex numbers.

The transfer characteristic calculation unit 123 registers the transfer characteristic calculated in this way in the transfer characteristic storage unit 124 (see FIG. 1) (step S124). At this time, the transfer characteristic calculation unit 123 issues an ID peculiar to the user, associates the calculated transfer characteristic (equivalent to a first transfer characteristic described later) with the issued ID, and registers the transfer characteristic associated with the issued ID in the transfer characteristic storage unit 124.

Next, the ID transmission/reception unit 125 transmits, to the client device 110, the ID issued by the transfer characteristic calculation unit 123 (step S125).

The ID transmission/reception unit 115 in the client device 110 receives the ID from the authentication server 120 (step S114). The ID transmission/reception unit 115 stores the received ID in a storage medium (not illustrated) included in the client device 110.

The client device 110 may further include a display device. In this configuration, the client device 110 may display the user ID issued by the authentication server 120 on the display device. Thus, the issued ID can be notified to the user.

(Operation Flow at Time of Authentication)

Figure 3:
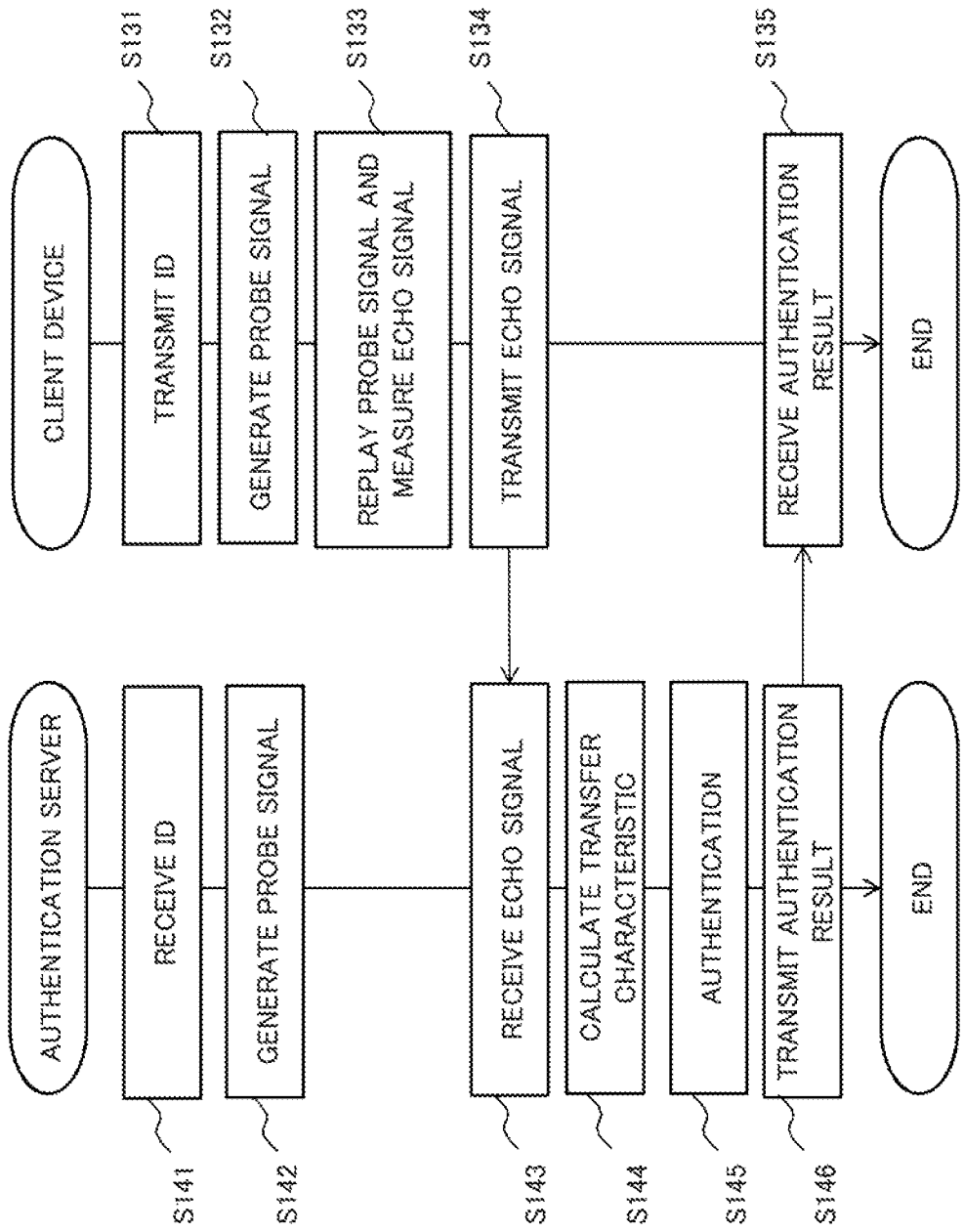
FIG. 3 is a flowchart illustrating a processing flow at a time of authentication in the biometric authentication system according to the first example embodiment of the present disclosure.

With reference to FIG. 3, an operation flow of the client device 110 and the authentication server 120 at a time of authenticating a user (authentication subject) is described.

The trigger for starting the operation may be provided on the side of the client device 110 by a user operation to an unillustrated input device, or may be provided from the authentication server 120. The user inputs the ID assigned from the authentication server 120 at the time of registration of the biometric information, by using the input device or the like included in the client device 110.

As illustrated in FIG. 3, the ID transmission/reception unit 115 in the client device 110 transmits the ID input by the user to the authentication server 120 (step S131). The ID transmission/reception unit 125 in the authentication server 120 receives the ID input by the user from the client device 110 (step S141).

The probe signal generation unit 111 generates a probe signal (step S132). The probe signal generation unit 121 also generates the same probe signal independently (step S142). A different probe signal is generated for each authentication.

The probe signal replay unit 112 replays and outputs the probe signal generated by the probe signal generation unit 111. The echo signal measurement unit 113 measures an echo signal generated by the probe signal being transmitted through the user's body or on the surface of the user's body (step S133).

The echo signal transmission unit 114 transmits, to the authentication server 120, the echo signal measured by the echo signal measurement unit 113 (step S134).

Next, the echo signal reception unit 122 receives the echo signal transmitted from the client device 110 (step S143). The transfer characteristic calculation unit 123 calculates a transfer characteristic peculiar to the user from the probe signal generated by the probe signal generation unit 121 and the echo signal received by the echo signal reception unit 122 (step S144).

The authentication unit 126 searches for the transfer characteristic associated with the ID input by the user with reference to the transfer characteristic storage unit 124. Then, the authentication unit 126 calculates a numerical value indicating a degree of similarity between the second transfer characteristic calculated by the transfer characteristic calculation unit 123 and the first transfer characteristic associated with the ID input by the user.

The authentication unit 126 performs biometric authentication, based on the calculated degree of similarity (step S145).

Specifically, the authentication unit 126 determines, when the numerical value indicating the calculated degree of similarity is equal to or more than a threshold value, that the user (authentication subject) and the user (registration subject) to be identified by the ID input by the user are the same person (authentication succeeds). On the other hand, the authentication unit 126 determines, when the numerical value indicating the calculated degree of similarity is less than the threshold value, that the user (authentication subject) and the user (registration subject) to be identified by the ID input by the user are not the same person (authentication fails).

An example of the above-described method for calculating a numerical value indicating the degree of similarity is described below.

In a first example, the authentication unit 126 generates a feature vector vec by using the transfer characteristic G(m) for each frequency band (m=1, 2, . . . ) calculated by the transfer characteristic calculation unit 123. The feature vector vec is calculated by (Equation 3).

$$\vec{vec} = [|G(m=1)|, |G(m=2)|, |G(m=3)|, \ldots |G(m=M)|] \quad \text{(Equation 3)}$$

In (Equation 3), M is a total number of frequency bands. Further, | | indicates an absolute value of a complex number.

The authentication unit 126 also generates, in a similar manner, a feature vector based on the first transfer characteristic associated with the ID input by the user. Then, the authentication unit 126 calculates a cosine of the angle formed by the two generated feature vectors as a degree of similarity. The degree of similarity to be calculated in this way is referred to as a cosine similarity.

It is assumed that a first feature vector based on the transfer characteristic G_test calculated by the transfer characteristic calculation unit 123 is vec_test, and a second feature vector based on the transfer characteristic G_enrol stored in the transfer characteristic storage unit 124 (and associated with the ID input by the user) is vec_enrol. In this case, the cosine similarity CS is calculated by (Equation 4).

$$CS = \frac{\vec{vec_{test}} \odot \vec{vec_{enrol}}}{|\vec{vec_{test}}||\vec{vec_{enrol}}|} \quad \text{(Equation 4)}$$

Herein, the operator of the numerator indicates an inner product of the feature vectors. | | indicates an absolute value (magnitude) of the feature vector.

The degree of similarity to be calculated by the authentication unit 126 is not limited to the cosine similarity described herein. For example, the authentication unit 126 can also calculate the degree of similarity by using a geometric distance between the feature vectors or the Mahalanobis' distance, or by using a statistical property of the feature vector such as a probabilistic linear discriminant analysis.

(Pattern and Spectrogram of Probe Signal)

Figure 4:
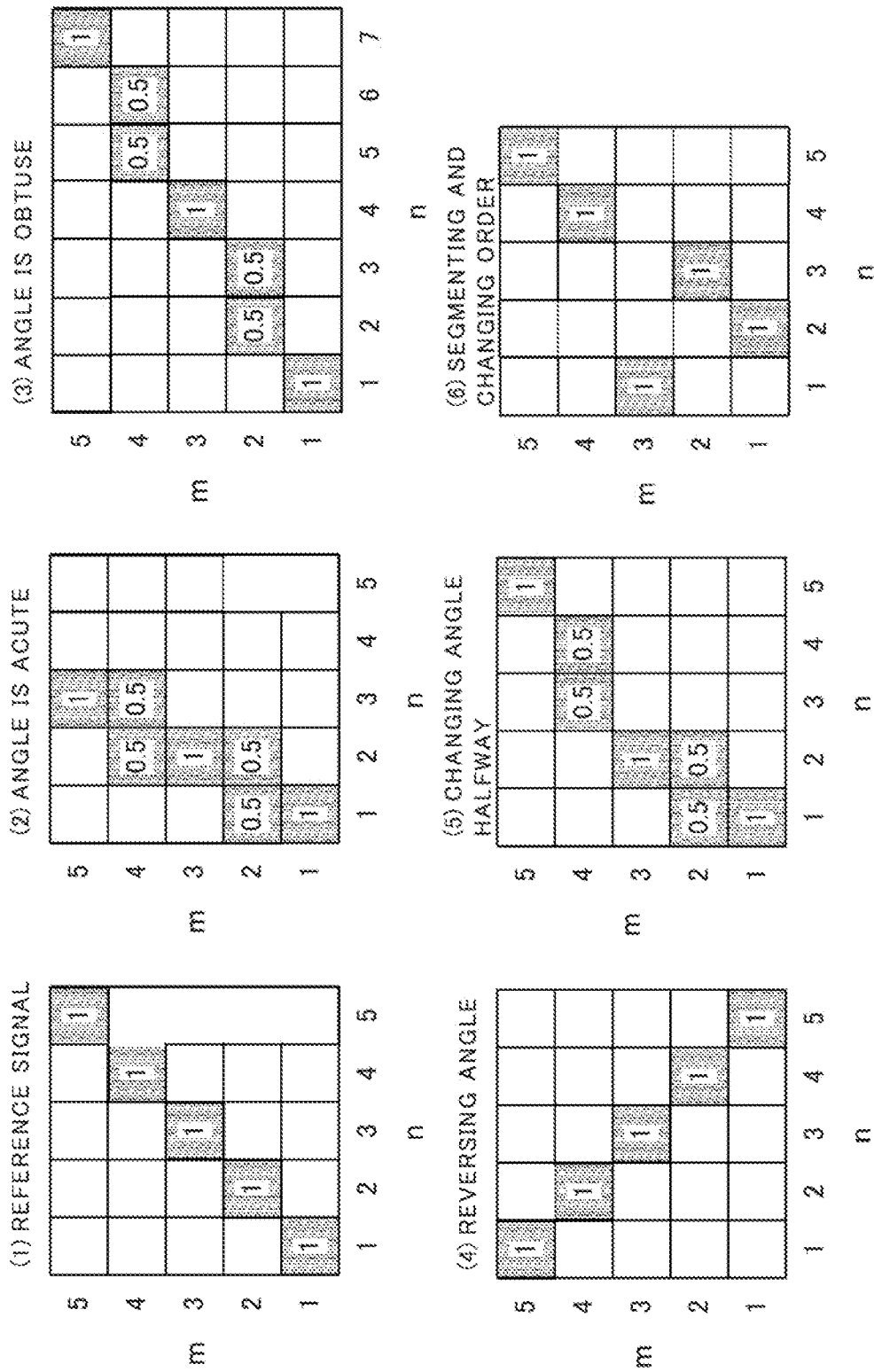
FIG. 4 is a diagram illustrating a pattern example of a spectrogram of a probe signal in the biometric authentication system according to the first example embodiment of the present disclosure.
Figure 5:
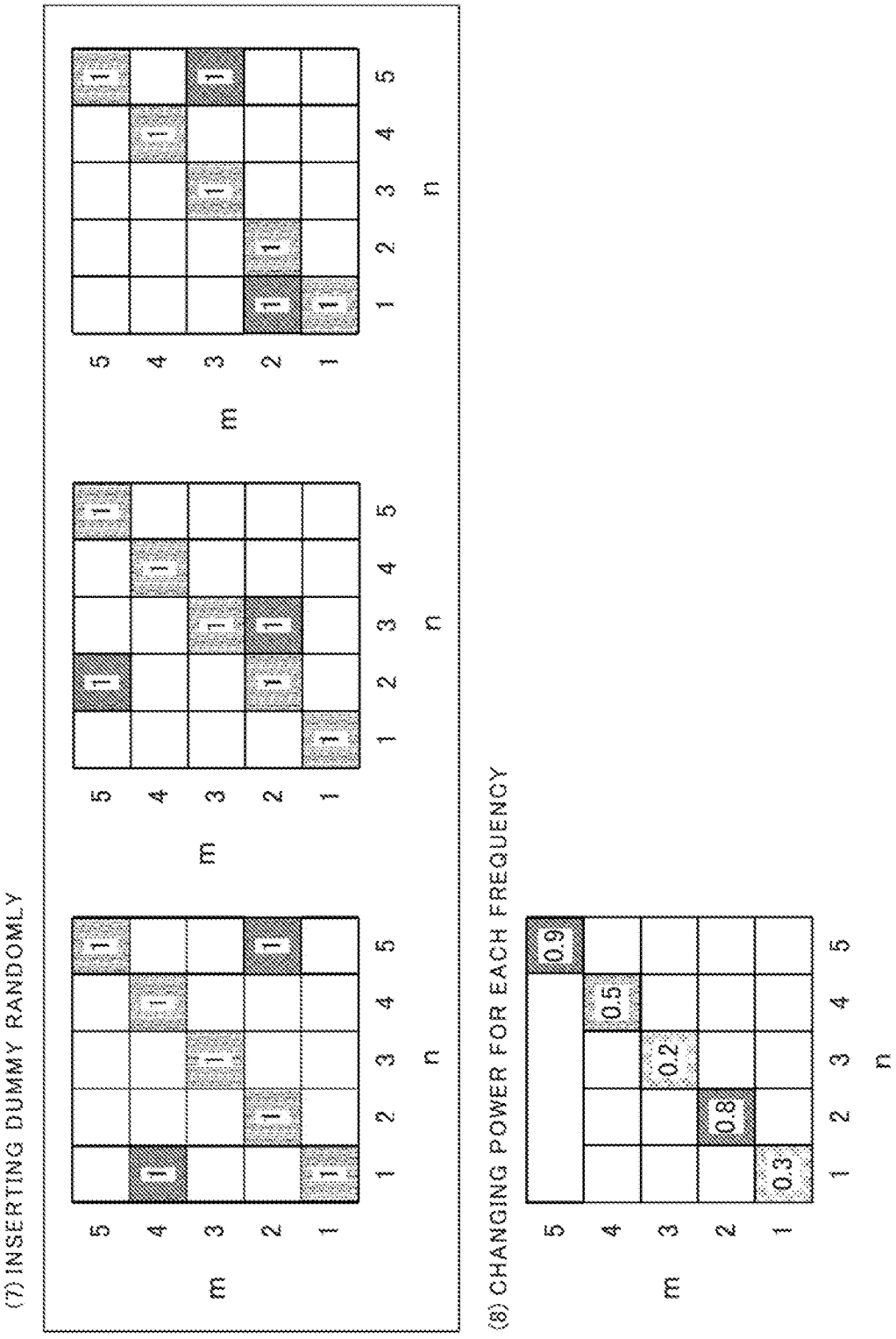
FIG. 5 is a diagram illustrating another pattern example of the spectrogram of the probe signal in the biometric authentication system according to the first example embodiment of the present disclosure.

FIGS. 4 to 5 indicate examples of a spectrogram of the probe signal. In FIGS. 4 to 5, m(=1 to 5) is an index of the frequency band and n(=1 to 5) is an index of time.

According to the present example embodiment, the probe signal generation units 111 and 121 generate a probe signal in a time domain. The spectrograms illustrated in FIGS. 4 to 5 can be acquired by segmenting, for each predetermined time window, the probe signals in the time domain generated by the probe signal generation units 111 and 121, and performing the Fourier transform on each of the probe signals segmented for each time window.

In the spectrograms of the probe signal illustrated in FIGS. 4 to 5, a numerical value illustrated in the matrix(m, n) indicates a spectrum power of the frequency band m at the time n.

FIGS. 4 to 5 exemplify the following eight patterns (1) to (8) of the probe signal.

(1) Reference signal: The frequency monotonically increases as time elapses.
(2) Angle is acute: The frequency rapidly increases as time elapses.
(3) Angle is obtuse: The frequency gradually increases as time elapses.
(4) Reversing the angle: The frequency monotonically decreases as time elapses.
(5) Changing the angle halfway: The frequency variation changes as time elapses.

(6) Segmenting and changing order: In a pattern in which the frequency monotonically increases when time elapses, the columns of the matrix are exchanged.

(7) Inserting a dummy randomly: A dummy signal is randomly added to the reference pattern (1). In this example, the echo signal is measured a plurality of number of times, and the effect of the dummy signal is removed, or a component related to the dummy signal is not calculated when the transfer characteristic is calculated.

(8) Changing power for each frequency band: In the reference pattern (1), the magnitude of power (amplitude) changes for each frequency band.

The probe signal may have a pattern in which a plurality of the above-described (1) to (8) are combined, or may have a pattern other than (1) to (8).

(Advantageous Effects of First Example Embodiment)

According to the configuration of the present example embodiment, the same probe signals are generated independently in the client device 110 and the authentication server 120. The client device 110 transmits, to the authentication server 120, an echo signal from inside or surface of a user's body. The echo signal does not depend on only a physical feature value of the user, i.e., biometric information. When the probe signal changes, the echo signal changes even for the same user.

The authentication server 120 calculates a transfer characteristic peculiar to the user from the probe signal generated by itself and the echo signal received from the client device 110. Even when an input/output of the client device 110 is sniffed, a third party cannot restore the biometric information from the echo signal. A reason for this is that the echo signal depends on the probe signal, however, the third party cannot acquire the probe signal. Therefore, a possibility of leakage of user biometric information to a third party can be reduced.

Second Example Embodiment (Configuration of Biometric Authentication System 2)

Figure 6:
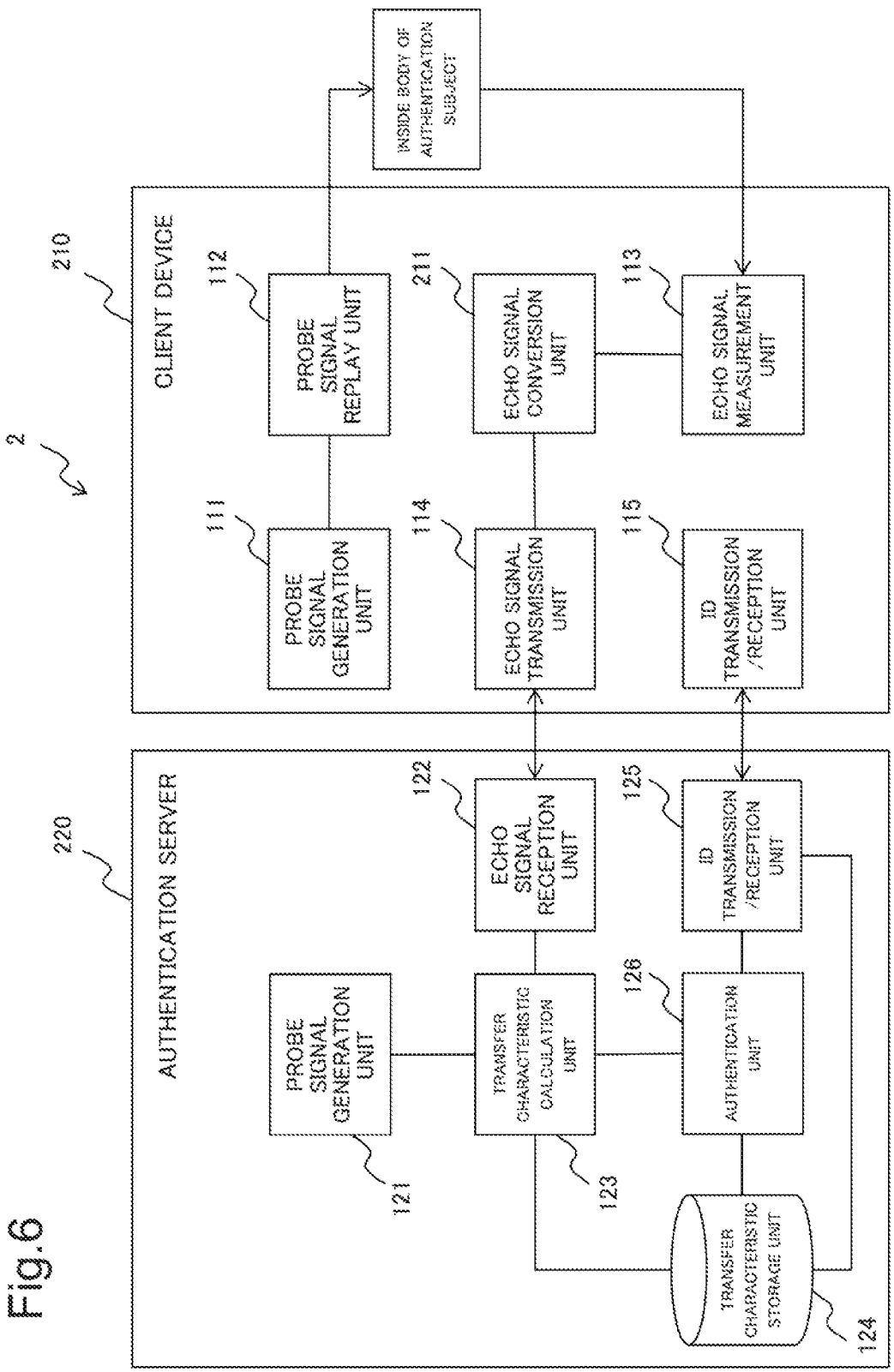
FIG. 6 is a block diagram illustrating a configuration of a biometric authentication system according to a second example embodiment of the present disclosure.

FIG. 6 is a block diagram illustrating a configuration of a biometric authentication system 2 according to the present example embodiment. As illustrated in FIG. 6, a configuration of a client device 210 included in the biometric authentication system 2 is slightly different from the configuration of the client device 110 included in the biometric authentication system 1 according to the first example embodiment. A configuration of an authentication server 220 included in the biometric authentication system 2 is the same as the configuration of the authentication server 120 according to the first example embodiment. However, an operation of the authentication server 220 according to the present example embodiment is partially different from the operation of the authentication server 120 according to the first example embodiment as described below.

As illustrated in FIG. 6, the client device 210 according to the present example embodiment further includes an echo signal conversion unit 211 in addition to the configuration of the client device 110 according to the first example embodiment. The echo signal conversion unit 211 converts an echo signal measured by an echo signal measurement unit 113 by using a transformation function.

In a first example, the echo signal conversion unit 211 performs the Fourier transform on an echo signal in a time domain. In (Equation 5), the echo signal in the time domain is represented by y(t−τ), the transformation function is represented by f(τ), and the echo signal after the Fourier transform is represented by y'(t).

$$y'(t)=(f*y)(t)=\int_{-\infty}^{+\infty} f(\tau)y(t-\tau)d\tau \quad \text{(Equation 5)}$$

In (Equation 5), t is time, τ is a variable, and * represents a convolution integral.

In a second example, the echo signal conversion unit 211 converts an echo signal in a frequency domain by a conversion signal. In (Equation 6), Y(m), F(m), and Y'(m) are each acquired by performing the Fourier transform on each of the echo signal in the time domain, the conversion signal, and the echo signal after conversion.

$$Y'(m)=F(m)\cdot Y(m) \quad \text{(Equation 6)}$$

In (Equation 6), m is an index of a frequency band.

A transfer characteristic calculation unit 123 in the authentication server 220 calculates a transfer characteristic G'(m) (m=1, 2, ...) by (Equation 7) by using the echo signal after conversion Y'(m) calculated by the echo signal conversion unit 211.

$$G'(m) = \frac{Y'(m)}{X(m)} = \frac{F(m)\cdot Y(m)}{X(m)} \quad \text{(Equation 7)}$$

The conversion signal F(m) may have various patterns similarly to the patterns of the probe signal illustrated in FIG. 4. With respect to a generation or determination method of the conversion signal F(m), some examples are described below.

In a first example, the conversion signal F(m) is generated by the echo signal conversion unit 211, based on a user operation.

In this configuration, the user can freely set the conversion signal F(m). Thus, the transfer characteristic calculation unit 123 can easily change a transfer characteristic (associated with an ID of the user) stored in a transfer characteristic storage unit 124 in the authentication server 220.

In a second example, the conversion signal F(m) is determined based on a value (such as serial number and MAC address) peculiar to the client device 210. The conversion signal F(m) is different for each client device 210.

In this configuration, a user can change the transfer characteristic by replacing the client device 210. Further, the conversion signal F(m) is information that can be known only by a manufacturer of the client device 210. In this configuration, an administrator (i.e., the manufacturer) of the conversion signal F(m) can be different from an administrator of the authentication server 220. Thereby, it is possible to prevent a person inside a company or an organization that operates a biometric authentication service from leaking information on the conversion signal F(m).

In a third example, the conversion signal F(m) is different for each authentication server 220 or for each biometric authentication service. In this configuration, it is possible to prevent the transfer characteristic from being reused among a plurality of authentication servers 220 or a plurality of biometric authentication services.

(Advantageous Effects of Second Example Embodiment)

According to the configuration of the present example embodiment, the echo signal Y(m) is converted by the conversion signal F(m). The transfer characteristic G'(m) depends on the conversion signal F(m) through the echo signal after conversion Y'(m). Therefore, even when the echo signal Y(m) leaks to a third party, the registered transfer characteristic G'(m) can be changed by the user changing the conversion signal F(m). That can prevent a third party from surreptitiously acquiring biometric information.

Third Example Embodiment (Configuration of Biometric Authentication System 3)

Figure 7:
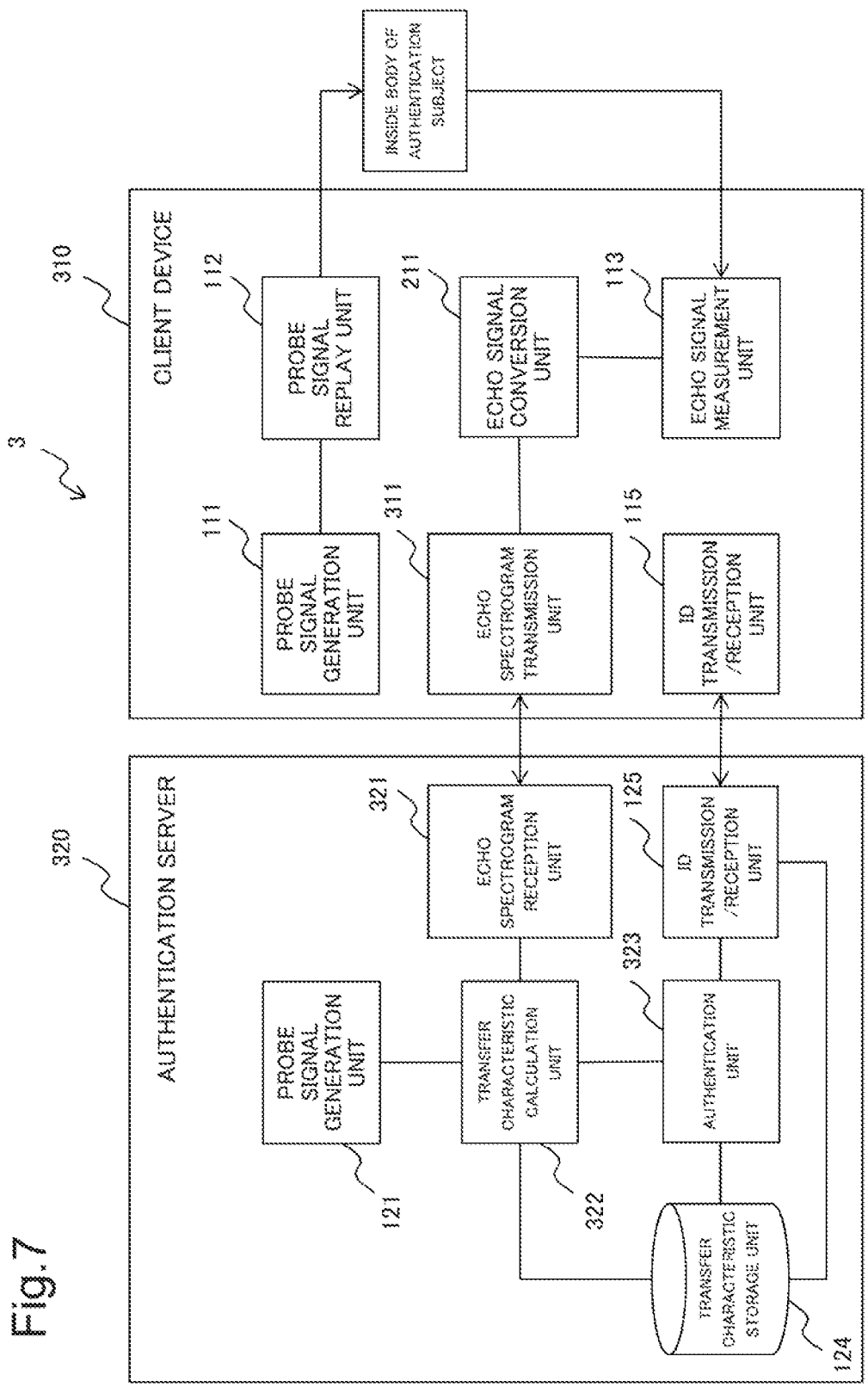
FIG. 7 is a block diagram illustrating a configuration of a biometric authentication system according to a third example embodiment of the present disclosure.

FIG. 7 is a block diagram illustrating a configuration of a biometric authentication system 3 according to the present example embodiment. As illustrated in FIG. 7, the biometric authentication system 3 includes a client device 310 and an authentication server 320. Configurations of the client device 310 and the authentication server 320 according to the present example embodiment are different from the configurations of the client device 110 and the authentication server 120 included in the biometric authentication system 1 according to the first example embodiment.

As illustrated in FIG. 7, the client device 310 according to the present example embodiment includes an echo spectrogram transmission unit 311 instead of the echo signal transmission unit 114 included in the client device 110 according to the first example embodiment. The authentication server 320 according to the present example embodiment replaces the echo signal reception unit 122 in the authentication server 120 according to the first example embodiment with an echo spectrogram reception unit 321, the transfer characteristic calculation unit 123 with a transfer characteristic calculation unit 322, and the authentication unit 126 with an authentication unit 323, respectively.
(Generation of Spectrogram of Echo Signal)

The echo spectrogram transmission unit 311 segments an echo signal Y(m) for each short time window from the entire echo signal measured by an echo signal measurement unit 113 while shifting the short time window in a time direction. The echo spectrogram transmission unit 311 calculates a spectrum Y(m, n_Y) (n_Y is an index of the short time window) in a frequency domain by performing the Fourier transform on the echo signal for each short time window. The echo spectrogram transmission unit 311 generates a spectrogram of the echo signal from the calculated spectrum Y(m, n_Y). Herein, the underscore (_) is used for indicating that the character immediately after the underscore is a subscript.

The echo spectrogram transmission unit 311 transmits the generated spectrogram of the echo signal to the authentication server 320.
(Calculation of Transfer Characteristic)

The transfer characteristic calculation unit 322 calculates an absolute value |G(m,n_G)| of a transfer characteristic G(m,n_G) by (Equation 8). As described above, the underscore (_) of "n_G" indicates that the character immediately after the underscore ("G" in this example) is a subscript.

$$|G(m, n_G)| = \frac{|Y(m, n_Y + n_G)|}{|X(m, n_X)|} \quad \text{(Equation 8)}$$

Alternatively, the transfer characteristic calculation unit 123 may calculate the absolute value |G(m,n_G)| of the transfer characteristic by (Equation 9).

$$|G(m, n_G)| = \frac{\Sigma_{n_X}|X(m, n_X)| \cdot |Y(m, n_G + n_X)|}{\Sigma_{n_X}|X(m, n_X)|^2} \quad \text{(Equation 9)}$$

n (Equation 8) and (Equation 9), n_X, n_Y, and n_G indicate a time index for each of the probe signal, the echo signal, and the transfer characteristic, respectively.

The authentication unit 323 arranges the absolute value |G(m, n_G)| of the transfer characteristic represented in (Equation 8) or (Equation 9) in an order of the index of the frequency band (m=1, 2, . . . ) and the short time window (n_G=1, 2, . . . ), and uses the arranged absolute value as a feature vector vec represented in (Equation 10).

$$\vec{vec} = [|G(1,1)|, |G(2,1)|, \ldots, |G(m,n_G)|, |G(M,N)|] \quad \text{(Equation 10)}$$

In (Equation 10), M indicates the maximum number of the indices of the frequency band, and N indicates the maximum number of the indices of the short time window.

The authentication unit 323 calculates a degree of similarity between a feature vector based on a first transfer characteristic registered in the authentication server 320 and a feature vector based on a second transfer characteristic calculated at the time of authentication, for example, the cosine similarity described according to the first example embodiment. Then, the authentication unit 323 performs biometric authentication, based on a magnitude relationship between a numerical value indicating the degree of similarity of these feature vectors and a predetermined threshold value.

Example of Spectrogram

An example of each spectrogram of the probe signal, the echo signal, and the transfer characteristic according to the present example embodiment is described with reference to FIG. 8.

Figure 8:
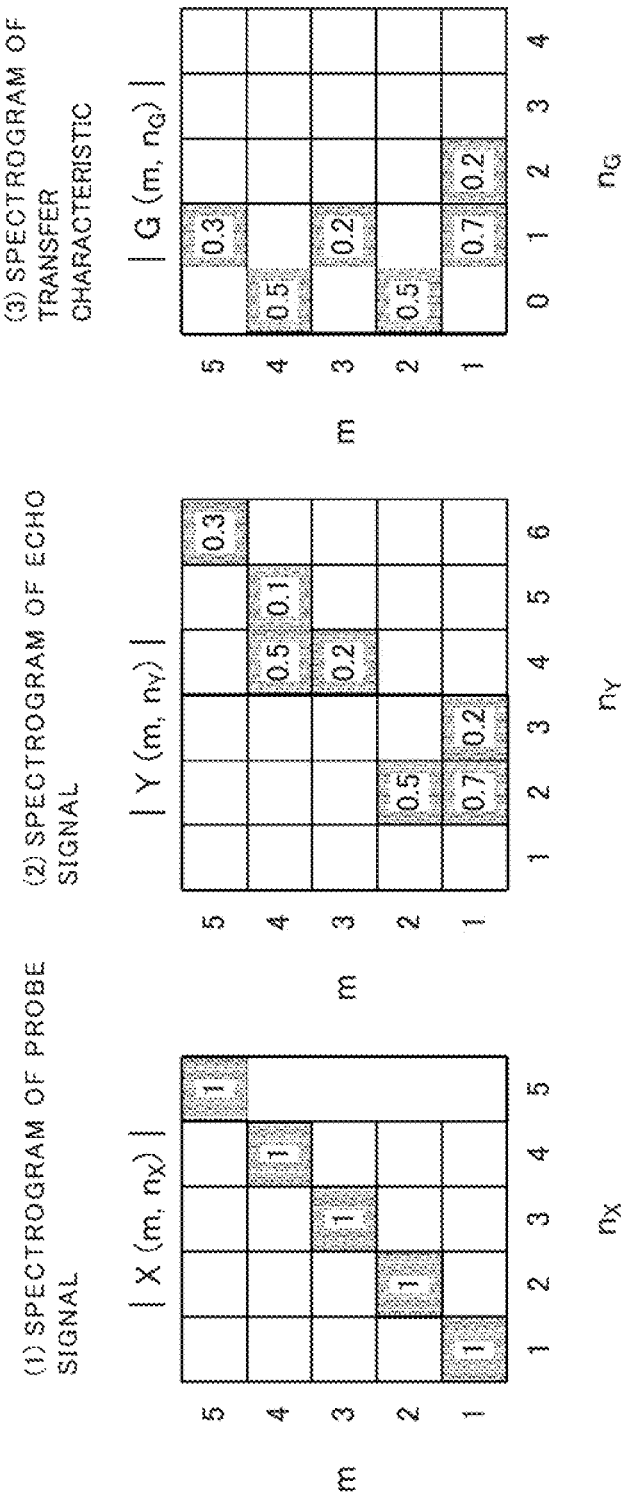
FIG. 8 is a diagram illustrating an example of an acoustic characteristic of the biometric authentication system according to the third example embodiment of the present disclosure, and is a diagram illustrating each spectrogram of a probe signal, an echo signal, and a transfer characteristic.

FIG. 8(1) is an example of the spectrogram of the probe signal in a frequency domain to be acquired by performing the Fourier transform on the probe signal in a time domain to be generated by probe signal generation units 111 and 121. In the example illustrated in FIG. 8(1), only the diagonal elements (m=n_X) take a value of 1, and the other elements take a value of 0. In other words, in the example illustrated in FIG. 8(1), the power of the probe signal |G(1,1)|=1 holds in the short time window of the frequency band m=1 and time n_X=1.

FIG. 8(2) is an example of the spectrogram of the echo signal in the frequency domain to be acquired by performing the Fourier transform on the echo signal in the time domain measured by the echo signal measurement unit 113. The probe signal X(m, n_X) illustrated in FIG. 8(1) changes into the echo signal Y(m, n_Y) illustrated in FIG. 8(2) by being transmitted through a user's body or on the surface of the user's body.

The value [power] of each element |G(m,n_G)| in the spectrogram of the transfer characteristic can be calculated by (Equation 8) or (Equation 9). For example, the power |G(m=1,n_G=2,3)| in the short time window of the frequency band m=1 and the time n_G=2,3 can be calculated as (Equation 11) and (Equation 12) represented below.

In the example illustrated in FIG. 8(3), the power |G(1, 1)|=0.7 holds in the short time window of the frequency band m=1 and the time n_G=1, and the power |G(1,2)|=0.2 holds in the short time window of the frequency band m=1 and the time n_G=2.

$$|G(m=1, n_G=1)| = \frac{|Y(m=1, n_Y+n_G=2)|}{|X(m=1, n_X=1)1|} = \frac{0.7}{1} = 0.7 \quad \text{(Equation 11)}$$

$$|G(m=1, n_G=2)| = \frac{|Y(m=1, n_Y+n_G=3)|}{|X(m=1, n_X=1)|} = \frac{0.2}{1} = 0.2 \quad \text{(Equation 12)}$$

When the denominator |X(m, n)| is zero in (Equation 11) and (Equation 12), the transfer characteristic |G(m, n_G)| cannot be calculated.

Modification Example

In one modification example, the feature value may be weighted in the frequency direction. For example, in order to reduce the influence of noise around a user on the echo signal, in the spectrogram of the echo signal, a frequency band having noise may be multiplied by a small weight, and a frequency band without noise may be multiplied by a large weight.

The feature value may also be weighted in the time direction. For example, a large weight may be added to a quick response and a small weight may be added to a late response. These weights may be used in combination.

(Advantageous Effect of Third Example Embodiment)

According to the configuration of the present example embodiment, the spectrogram is generated for each of the probe signal, the echo signal, and the transfer characteristic.

For example, the spectrogram of the echo signal includes information on how the probe signal has changed, where the probe signal is reflected for each frequency band, at what rate the probe signal is absorbed, and how long the echo has lasted, by the probe signal being transmitted through a user's body or on the surface of the user's body.

The transfer characteristic is calculated, based on the probe signal and the echo signal. Therefore, the spectrogram of the transfer characteristic includes information peculiar to a user based on a physical feature of the user. Thus, the user can be authenticated, based on the spectrogram of the transfer characteristic.

Fourth Example Embodiment (Configuration of Biometric Authentication System 4)

Figure 9:
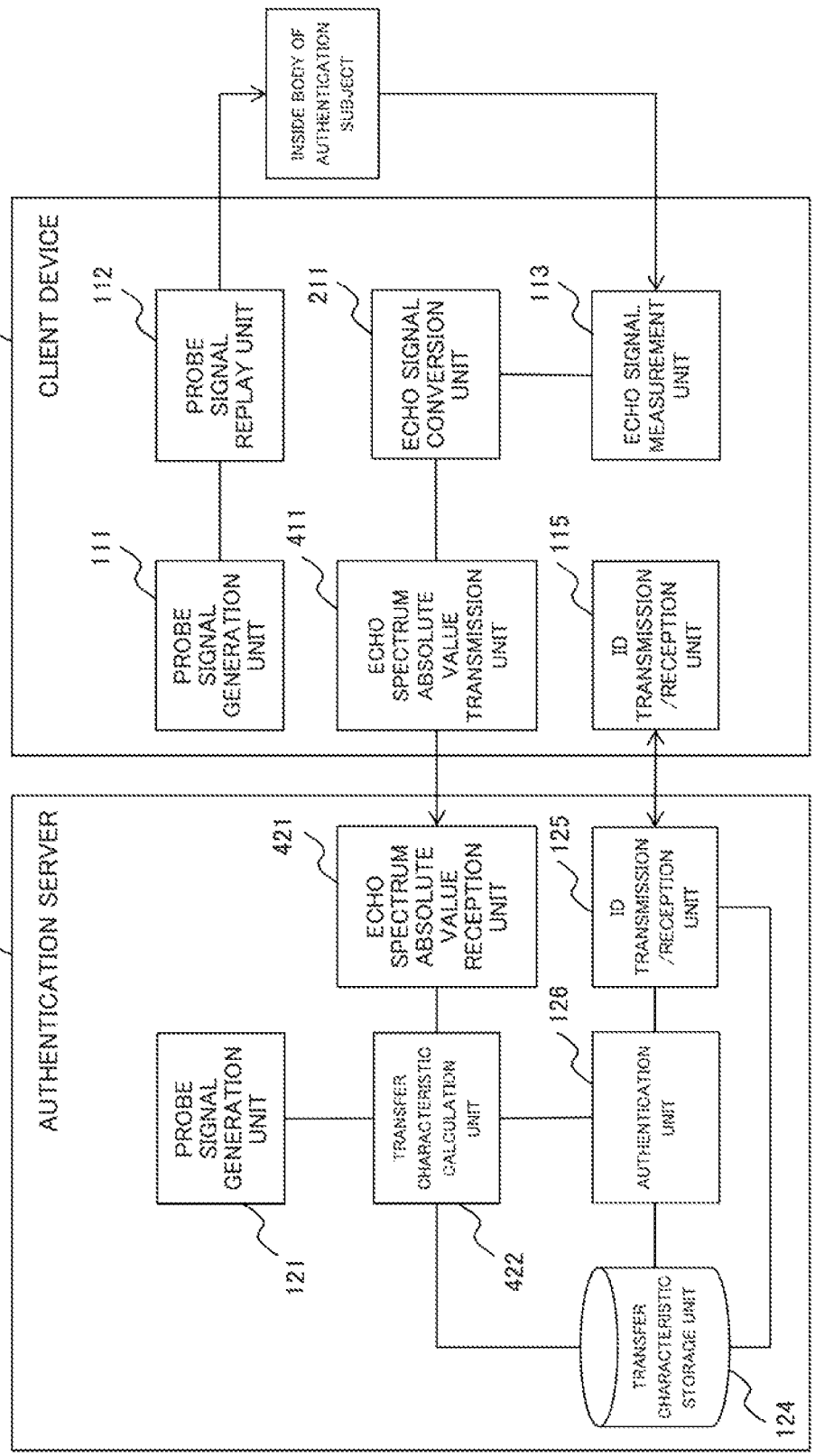
FIG. 9 is a block diagram illustrating a configuration of a biometric authentication system according to a fourth example embodiment of the present disclosure.

FIG. 9 is a block diagram illustrating a configuration of a biometric authentication system 4 according to the present example embodiment.

As illustrated in FIG. 9, the biometric authentication system 4 includes a client device 410 and an authentication server 420. Configurations of the client device 410 and the authentication server 420 according to the present example embodiment are different from the configurations of the client device 110 and the authentication server 120 according to the first example embodiment.

The client device 410 includes an echo spectrum absolute value transmission unit 411 instead of the echo signal transmission unit 114 included in the client device 110 according to the first example embodiment.

The authentication server 420 includes an echo spectrum absolute value reception unit 421 instead of the echo signal reception unit 122 included in the authentication server 120 according to the first example embodiment. Operations of a transfer characteristic calculation unit 422 and an authentication unit 126 included in the authentication server 420 according to the present example embodiment are partially different from the operations of the transfer characteristic calculation unit 123 and the authentication server 126 according to the first example embodiment.

The echo spectrum absolute value transmission unit 411 transmits, to the authentication server 420, an absolute value |Y(m)| of an echo signal Y(m) in a frequency band. The echo signal Y(m) in a frequency domain is acquired by performing the Fourier transform on an echo signal y(t) in a time domain. |Y(m)| is acquired by performing an absolute value operation on the echo signal Y(m) in the frequency domain.

The echo spectrum absolute value reception unit 421 in the authentication server 420 receives, from the client device 410, the absolute value |Y(m)| of the echo signal in the frequency domain.

According to the present example embodiment, the echo spectrum absolute value transmission unit 411 calculates an absolute value |Y(m,n_Y)| of the entire echo signal Y(m) in the frequency domain or a time average of the absolute value.

The transfer characteristic calculation unit 422 calculates an absolute value |G(m)| of a transfer characteristic by (Equation 13).

$$|G(m)| = \frac{|Y(m)|}{|X(m)|} \quad \text{(Equation 13)}$$

Alternatively, the transfer characteristic calculation unit 422 may calculate a square value $|G(m)|^2$ represented in (Equation 14) instead of calculating the absolute value |G(m)| of the transfer characteristic represented in (Equation 13).

$$|G(m)|^2 = \frac{|Y(m)|^2}{|X(m)|^2} \quad \text{(Equation 14)}$$

(Advantageous Effect of Fourth Example Embodiment)

According to the present example embodiment, the transfer characteristic calculation unit 422 calculates the transfer characteristic without using time direction information of the echo signal. Therefore, the data size of the echo signal to be transmitted from the client device 410 to the authentication server 420 can be reduced. According to the present example embodiment, it is preferable to use a probe signal having different power for each frequency band in such a way that the transfer characteristic is hard to be estimated.

Fifth Example Embodiment (Configuration of Biometric Authentication System 5)

Figure 10:
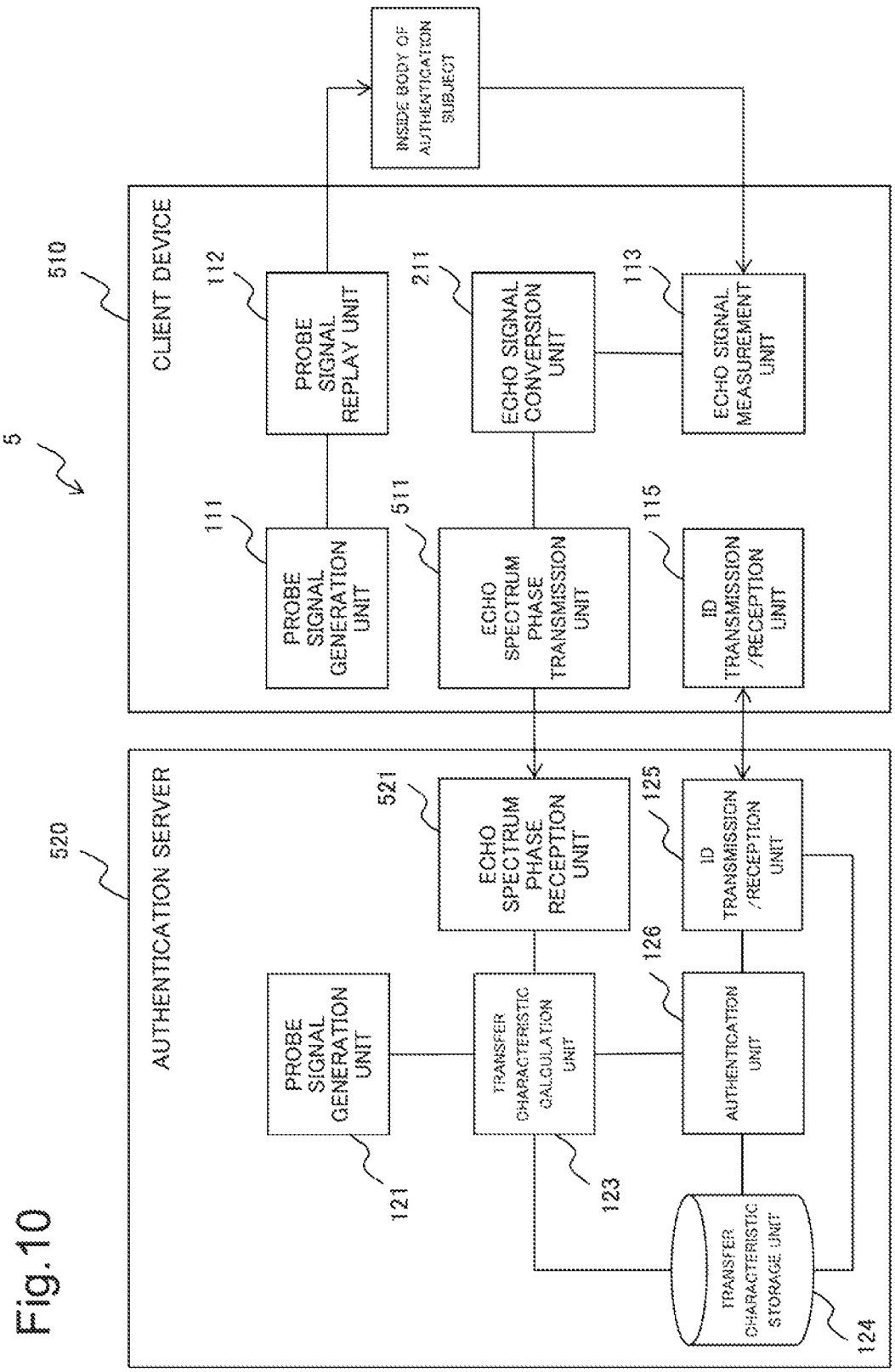
FIG. 10 is a block diagram illustrating a configuration of a biometric authentication system according to a fifth example embodiment of the present disclosure.

FIG. 10 is a block diagram illustrating a configuration of a biometric authentication system 5 according to the present example embodiment.

As illustrated in FIG. 10, the biometric authentication system 5 according to the present example embodiment includes a client device 510 and an authentication server 520.

The client device 510 according to the present example embodiment includes an echo spectrum phase transmission unit 511 instead of the echo signal transmission unit 114 included in the client device 110 according to the first example embodiment.

The authentication server 520 includes an echo spectrum phase reception unit 521 instead of the echo signal reception unit 122 included in the authentication server 120 according to the first example embodiment. Operations of a transfer characteristic calculation unit 123 and an authentication unit 126 in the authentication server 520 are partially different from the operations of the transfer characteristic calculation unit 123 and the authentication server 126 in the authentication server 120.

The echo spectrum phase transmission unit 511 extracts a phase θ_Y(m) from an echo signal Y(m) in a frequency domain. The echo spectrum phase transmission unit 511 transmits information on the extracted phase θ_Y(m) to the authentication server 520.

The echo spectrum phase transmission unit 511 can calculate the phase θ_Y(m) from the echo signal Y(m) in the frequency domain by (Equation 15).

$$\theta_Y(m) = \arctan\left(\frac{\mathrm{Im}[Y(m)]}{\mathrm{Re}[Y(m)]}\right) \quad \text{(Equation 15)}$$

In (Equation 15), Re[Y(m)] and Im[Y(m)] indicate a real part and an imaginary part of the echo signal Y(m), respectively.

The authentication unit 126 calculates, by (Equation 16), a phase difference θ_G(m) between a phase θ_Y(m) of a second transfer characteristic calculated from the echo signal Y(m) by the transfer characteristic calculation unit 123, and a phase θ_X(m) of a first transfer characteristic associated with an ID input by a user.

$$\theta_G(m) = \theta_Y(m) - \theta_X(m) \quad \text{(Equation 16)}$$

The authentication unit 126 calculates, by (Equation 17), a cross-correlation function cross(t) from the calculated phase difference θ_G(m).

$$\mathrm{cross}(t) = \mathrm{IFFF}[G^*_{test}(m) \cdot G_{enrol}(m)] \quad \text{(Equation 17)}$$

In (Equation 17), IFFT indicates an inverse Fourier transform. Herein, the authentication unit 126 can calculate, by (Equation 18), G*_test(m) indicated in (Equation 17) from a phase θ_G^test(m) (symbol ^ represents a superscript) of a transfer characteristic G_test(m) calculated by the transfer characteristic calculation unit 123 at the time of authentication.

$$G^*_{test}(m) = \exp[-j\theta_G^{test}(m)] \quad \text{(Equation 18)}$$

The authentication unit 126 can calculate, by (Equation 19), G_enrol(m) indicated in (Equation 17) from a phase θ_G^enrol(m) of a transfer characteristic G_enrol(m) calculated by the transfer characteristic calculation unit 123 at the time of registration.

$$G_{enrol}(m) = \exp[j\theta_G^{enrol}(m)] \quad \text{(Equation 19)}$$

A value of the cross-correlation function cross(t=0) indicated in (Equation 17) may be a value indicating a degree of similarity, or the maximum value of cross(t) may be a numerical value indicating the degree of similarity. The value of t is equivalent to a time difference between the time of registration and the time of authentication. When it is not possible to ensure that the time from replay of the probe signal to measurement of the echo signal is constant at the time of registration and at the time of authentication, the maximum value of the cross-correlation function cross(t) is set as a numerical value indicating the degree of similarity.

The phase is sensitive to a temporal change, and thus, among the patterns (1) to (8) illustrated in FIGS. 4 and 5, the patterns other than (8) each have different phase information. Therefore, according to the present example embodiment, the patterns (1) to (8) illustrated in FIGS. 4 and 5 can be used as a pattern of different probe signals.

(Advantageous Effect of Fifth Example Embodiment)

According to the present example embodiment, the transfer characteristic is calculated without using time direction information of the echo signal. Therefore, the data size of the echo signal to be transmitted from the client device 510 to the authentication server 520 can be reduced.

Using any of the patterns of the probe signal illustrated in FIGS. 4 and 5, or using a combination of the patterns randomly enables the phase θ_Y(m) of the echo signal Y(m) to become sufficiently random. Thus, even when a malicious third party sniffs the echo signal transmitted from the client device 510 to the authentication server 520, it is extremely difficult to estimate the phase of the echo signal. Therefore, high security can be ensured for communication between the client device 510 and the authentication server 520.

Sixth Example Embodiment (Configuration of Biometric Authentication System 6)

Figure 11:
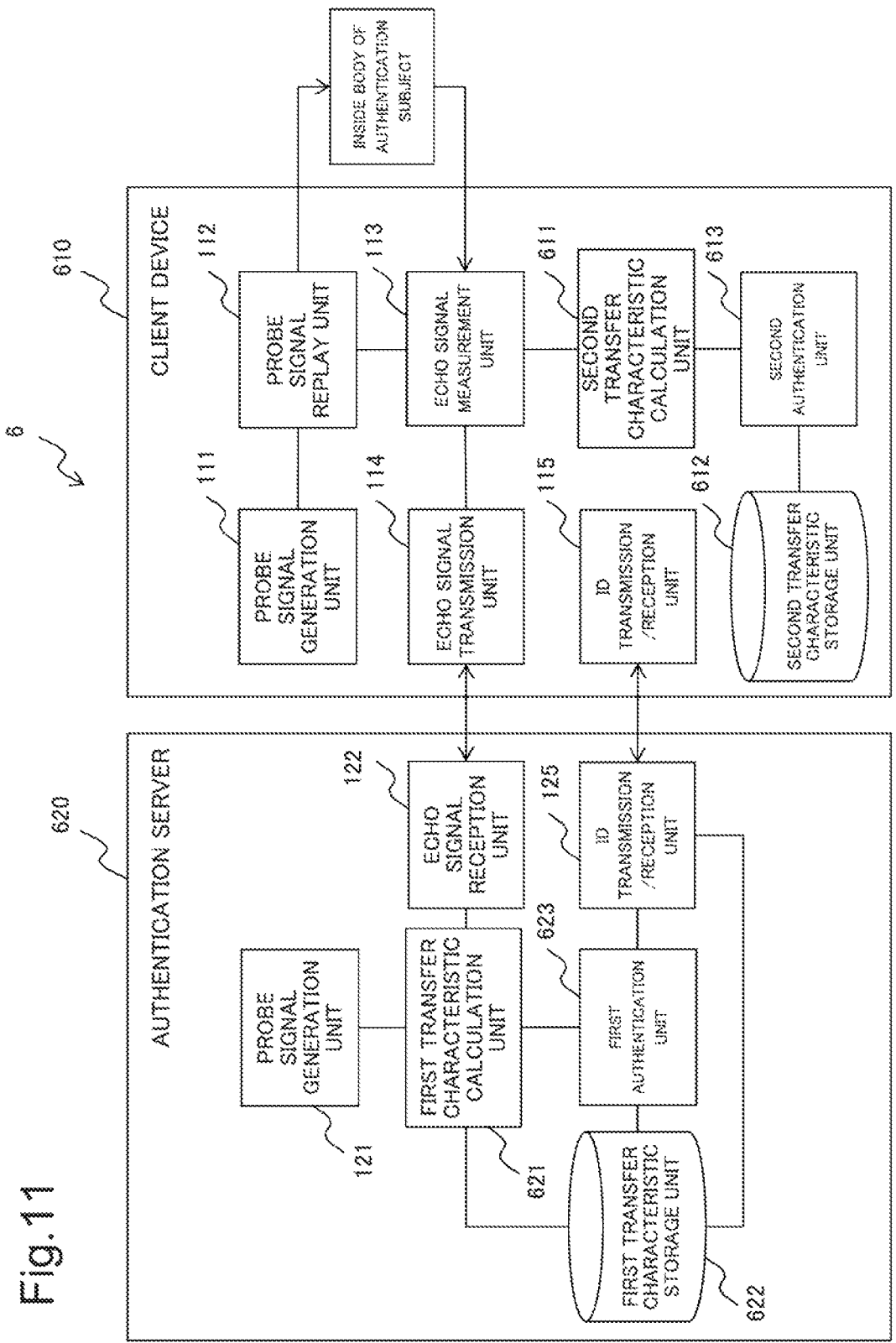
FIG. 11 is a block diagram illustrating a configuration of a biometric authentication system according to a sixth example embodiment of the present disclosure.

FIG. 11 is a block diagram illustrating a configuration of a biometric authentication system 6 according to the present example embodiment.

As illustrated in FIG. 11, the biometric authentication system 6 according to the present example embodiment includes a client device 610 and an authentication server 620.

As illustrated in FIG. 11, the client device 610 according to the present example embodiment further includes, a second transfer characteristic calculation unit 611, a second transfer characteristic storage unit 612, and a second authentication unit 613, in addition to the configuration of the client device 110 according to the first example embodiment.

Configurations and operations of the second transfer characteristic calculation unit 611 and the second authentication unit 613 in the client device 610 are the same as the configurations and the operations of the transfer characteristic calculation unit 123 and the authentication unit 126 included in the authentication server 120 according to the first example embodiment. Similarly to the transfer characteristic storage unit 124 included in the authentication server 120 according to the first example embodiment, the second transfer characteristic storage unit 612 in the client device 610 associates a transfer characteristic (first transfer characteristic) of a user (registration subject) with an ID assigned to the user and stores the associated transfer characteristic.

The authentication server 620 according to the present example embodiment includes a first transfer characteristic calculation unit 621, a first transfer characteristic storage unit 622, and a first authentication unit 623, instead of the transfer characteristic calculation unit 123, the transfer characteristic storage unit 124, and the authentication unit 126 included in the authentication server 120 according to the first example embodiment.

Configurations and operations of the first transfer characteristic calculation unit 621, the first transfer characteristic storage unit 622, and the first authentication unit 623 in the authentication server 620 are the same as the configurations and the operations of the transfer characteristic calculation unit 123, the transfer characteristic storage unit 124, and the authentication unit 126 in the authentication server 120.

In other words, similarly to the transfer characteristic calculation unit 123, the first transfer characteristic calculation unit 621 can calculate, from a probe signal and an echo signal, a transfer characteristic peculiar to a user. Similarly to the transfer characteristic storage unit 124, the first transfer characteristic storage unit 622 associates the transfer characteristic peculiar to the registered user with the ID and stores the associated transfer characteristic. Similarly to the authentication unit 126, the first authentication unit 623 authenticates the user by comparing the transfer characteristic at the time of registration to be stored in the first transfer characteristic storage unit 622 and the transfer characteristic calculated by the first transfer characteristic calculation unit 621 at the time of authentication.

(Advantageous Effect of Sixth Example Embodiment)

According to the configuration of the present example embodiment, either one or both of the client device 610 and the authentication server 620 can perform biometric authentication. Therefore, depending on a situation, the client device 610 and the authentication server 620 can share or complement authentication.

As one example of the complement, when communication between the client device 610 and the authentication server 620 is disconnected or a response without communication delay is required, the user authentication may be performed on the side of the client device 610. On the other hand, when the communication between the client device 610 and the authentication server 620 is established and authentication with high reliability is required, the authentication may be performed by the authentication server 620.

As one example of the sharing, the client device 610 may transmit, to the authentication server 620, only a part of the echo signals. In this way, even when information including a part of the echo signals transmitted from the client device 610 to the authentication server 620 is sniffed, a third party cannot completely restore biometric information from only the surreptitiously acquired information.

Alternatively, the authentication using an absolute value of a spectrogram of the echo signal may be performed on the side of the client device 610, and the authentication using phase information of the spectrogram of the echo signal may be performed in the authentication server 620. In this configuration, the client device 610 and the authentication server 620 each perform the authentication independently, and thus accuracy of the authentication can be improved.

Seventh Example Embodiment

According to the present example embodiment, biometric authentication combining a public key cryptosystem and an electronic signature is described. All of the biometric authentication devices described according to the first example embodiment to the sixth example embodiment are able to perform the biometric authentication described according to the present example embodiment.

First, the authentication server (120 to 620) transmits, to the client device (110 to 610), an electronic signature and a public key. The client device (110 to 610) verifies whether the electronic signature has been issued formally by inquiring a trusted third party certificate authority.

Next, the client device (110 to 610) encrypts a measured echo signal and an ID by the public key and transmits to the authentication server (120 to 620). The echo signal can be decrypted only by an encryption key stored in the authentication server (120 to 620). Therefore, even when communication between the client device (110 to 610) and the authentication server (120 to 620) is sniffed on a network, a third party cannot decrypt the encrypted echo signal.

The authentication server (120 to 620) decrypts the echo signal by using the associated encryption key, and calculates a transfer characteristic from the decrypted echo signal. The authentication server (120 to 620) performs biometric authentication by comparing a registered transfer characteristic and the calculated transfer characteristic.

(Advantageous Effect of Seventh Example Embodiment)

According to the configuration of the present example embodiment, the echo signal to be transmitted from the client device (110 to 610) to the authentication server (120 to 620) is encrypted by a public key. The authentication server (120 to 620) decrypts the echo signal from the client server (110 to 610) by using the encryption key. A third party does not have the encryption key, and thus, even when the encrypted echo signal transmitted from the client device (110 to 610) is sniffed, the third party cannot decrypt the echo signal. Therefore, the security of the communication between the client device (110 to 610) and the authentication server (120 to 620) can be further improved.

Eighth Example Embodiment

According to the present example embodiment, hardware using a computer implements a biometric authentication system. The hardware is configured in such a way that a third party cannot surreptitiously see the progress of processing by the hardware. All of the biometric authentication devices described according to the first example embodiment to the seventh example embodiment are able to implement as hardware using a computer as described according to the present example embodiment.

(Configuration of Biometric Authentication System 7)

Figure 12:
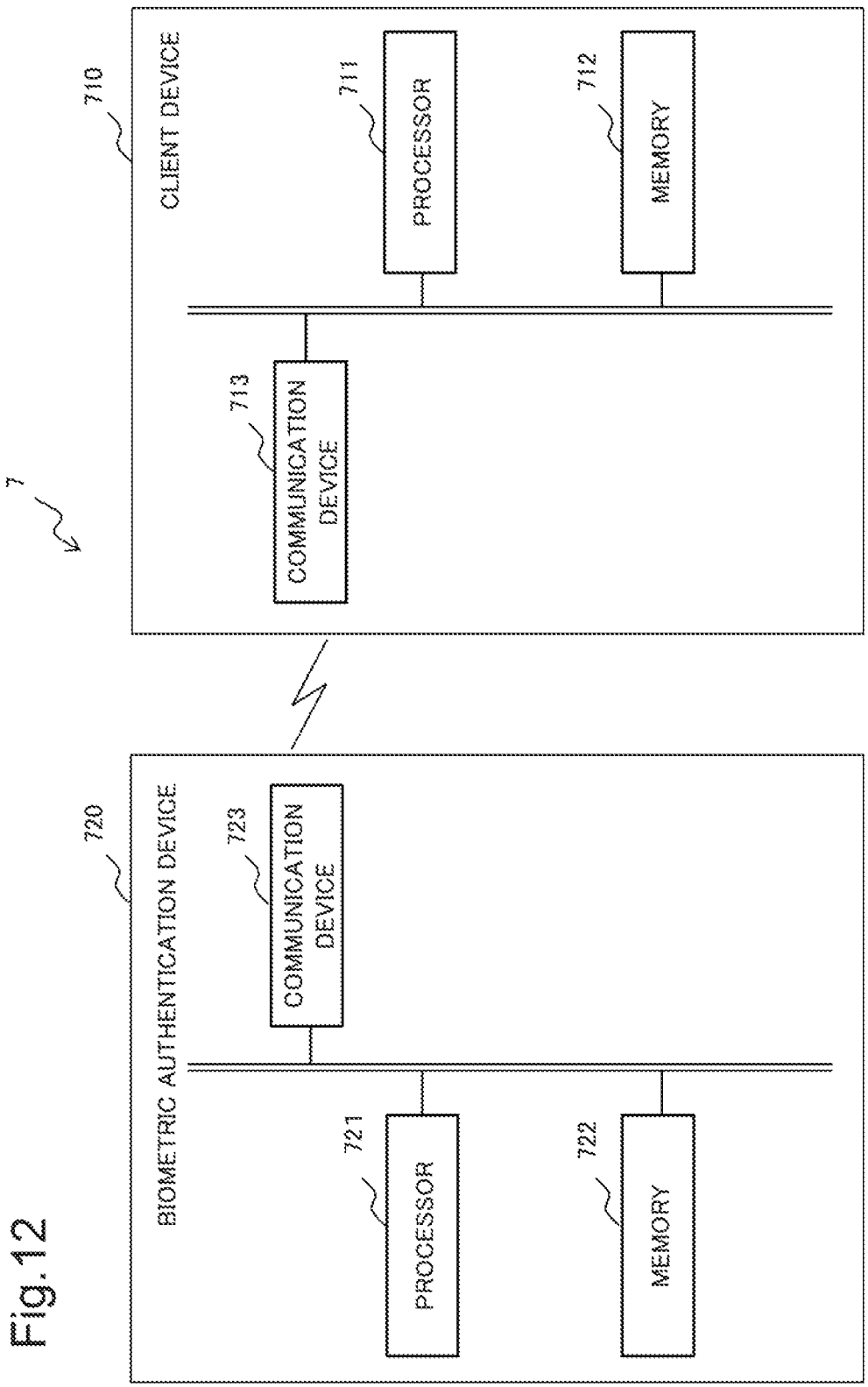
FIG. 12 is a block diagram illustrating a configuration of a biometric authentication system according to a seventh example embodiment of the present disclosure.

In FIG. 12, a biometric authentication system 7 according to the present example embodiment includes a client device 710 and a biometric authentication device 720.

As illustrated in FIG. 12, the client device 710 includes a processor 711, a memory 712, and a communication device 713.

The client device 710 may include the same configuration as any of the client devices 110 to 610 described according to the first example embodiment to the seventh example embodiment. In this case, the processor 711 in the client device 710 causes a program read in the memory 712 to execute, thereby functioning as all or a part of the components included in the client devices 110 to 610 described according to the first example embodiment to the seventh example embodiment.

The hardware constituting the client device 710 is configured in such a way that a third party cannot surreptitiously see the progress of processing related to the probe signal and the echo signal.

Therefore, the third party cannot observe both the probe signal and the echo signal at the same time. Thus, a risk of leakage of biometric information can be suppressed.

As described in the seventh example embodiment, it is preferable that communication between the client device 710 and the biometric authentication device 720 is encrypted by a public key. Thus, even when the communication between the client device 710 and the biometric authentication device 720 is sniffed, it is difficult for a third party to restore original information (echo signal and ID) from the encrypted communication, and therefore the risk of leakage of the biometric information can be further reduced.

As illustrated in FIG. 12, the biometric authentication device 720 also includes a processor 721, a memory 722, and a communication device 723. The memory 722 includes a transfer characteristic storage unit 124 or a first transfer characteristic storage unit 622.

The biometric authentication device 720 may include the same configuration as any of the authentication servers 120 to 620 described according to the first example embodiment to the seventh example embodiment. In this case, the processor 721 in the biometric authentication device 720 causes a program read in the memory 722 to execute, thereby functioning as all or a part of the components included in the authentication servers 120 to 620 described according to the first example embodiment to the seventh example embodiment.

The hardware constituting the biometric authentication device 720 is configured in such a way that a third party cannot surreptitiously see the progress of processing related to the probe signal, the echo signal, and a transfer characteristic.

The client device 710 may embed, in information to be transmitted to the biometric authentication device 720, a mark for certifying that the replay of the probe signal and the measurement of the echo signal have been performed by the hardware constituting the client device 710. Thus, the biometric authentication device 720 can distinguish the real client device 710 from a device manufactured by imitating the client device 710. For example, the client device 710 may add, as a certification mark, a small signal to the echo signal to be transmitted.

(Advantageous Effect of Eighth Example Embodiment)

According to the configuration of the present example embodiment, a part or all of the means included in the client device (110 to 610) and the authentication server (120 to 620) included in the biometric authentication system (1 to 6) described according to the first example embodiment to the seventh example embodiment can be implemented as hardware (machine) by using a computer. The hardware constituting the client device and the authentication server is configured in such a way that a third party cannot surreptitiously see the progress of processing. Therefore, a malicious third party cannot acquire information necessary for restoring the biometric information. Thus, the risk of leakage of the biometric information can be reduced.

Ninth Example Embodiment

According to the present example embodiment, a minimum configuration of a biometric authentication device according to one aspect of the present disclosure is described.

(Configuration of Biometric Authentication Device 820)

FIG. 13 is a block diagram illustrating a configuration of a biometric authentication device 820 according to the present example embodiment. As illustrated in FIG. 13, the biometric authentication device 820 includes a probe signal generation unit 821, a response signal reception unit 822, a transfer characteristic calculation unit 823, and an authentication unit 824.

As illustrated in FIG. 13, the response signal reception unit 822 receives a response signal from a client device. The response signal is a signal in which a probe signal changed by being transmitted through the body or on the surface of the body of an authentication subject. The probe signal is applied to the authentication subject by the client device.

The probe signal generation unit 821 generates the same probe signal as the probe signal applied by the client device.

The transfer characteristic calculation unit 823 calculates a transfer characteristic of the authentication subject using the probe signal generated by the probe signal generation unit 821 and the response signal.

The authentication unit 824 authenticates the authentication subject by comparing a previously registered transfer characteristic and the transfer characteristic calculated by the transfer characteristic calculation unit 823.

(Advantageous Effect of Ninth Example Embodiment)

According to the configuration of the present example embodiment, the response signal is transmitted from the client device to the biometric authentication device 820. However, the response signal does not include information on the probe signal. The biometric authentication device 820 generates a probe signal independently of the client device. Then, the transfer characteristic is calculated, based on the generated probe signal and the received response signal.

A third party can acquire the response signal only, when sniffing communication between the client device and the biometric authentication device 820. However, the third party cannot acquire the probe signal, and therefore cannot restore the transfer characteristic from the response signal only. Thus, a risk of leakage of user biometric information to the third party can be reduced.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by the claims.

This application is based upon and claims the benefit of priority from Japanese patent application No. 2017-206243, filed on Oct. 25, 2017, the disclosure of which is incorporated herein in its entirety by reference.

REFERENCE SIGNS LIST 110 to 610 Client device
111 Probe signal generation unit
112 Probe signal replay unit
113 Echo signal measurement unit
114 Echo signal transmission unit
115 ID transmission/reception unit
613 Second authentication unit
120 to 620 Authentication server
121 Probe signal generation unit
122 Echo signal reception unit
123 Transfer characteristic calculation unit
124 Transfer characteristic storage unit
125 ID transmission/reception unit
126 Authentication unit
623 First authentication unit

The invention claimed is:
1. A biometric authentication system comprising:
a biometric authentication device and a client device,
the biometric authentication device is configured to perform operations to:
    receive a response signal from a client device, the response signal being a signal in which a probe signal changed by being transmitted through a body or on a surface of the body of an authentication subject, the probe signal being a signal applied to the authentication subject by the client device;
    generate a same probe signal as the probe signal applied by the client device;
    calculate a transfer characteristic of the authentication subject using the probe signal generated and the response signal; and
    authenticate the authentication subject by comparing a previously registered transfer characteristic and the transfer characteristic calculated,
    wherein the probe signal is configured of a pattern, a frequency of which changes over time; and the client device is configured to perform operations to:
replay the probe signal,
output the replayed probe signal toward the authentication subject;
measure the response signal from the authentication subject; and
transmit the response signal measured to the biometric authentication device,
the biometric authentication device further performs operation to receive the response signal, wherein
the client device and the biometric authentication device each store information on a previously registered transfer characteristic,
first authentication related to the authentication subject is performed by the client device, based on the previously registered transfer characteristic and the response signal measured, and
second authentication related to the authentication subject is performed by the biometric authentication device.

2. The biometric authentication system according to claim 1, wherein the biometric authentication device further performs operation to:
calculate an absolute value or a power of a spectrum of the transfer characteristic, by using an absolute value or a power of a spectrum of the probe signal and an absolute value or a power of a spectrum of the response signal; and
authenticate the authentication subject, by using the absolute value or the power of the spectrum of the transfer characteristic.

3. The biometric authentication system according to claim 1, wherein the biometric authentication device further performs operation to:
calculate a phase of a spectrum of the transfer characteristic, by using a phase of a spectrum of the probe signal and a phase of a spectrum of the response signal; and
authenticate the authentication subject, by using the absolute value or the power of the spectrum of the transfer characteristic.

4. The biometric authentication system according to claim 1, wherein the biometric authentication device further performs operation to:
calculate a spectrogram of the transfer characteristic, by using a spectrogram of the probe signal and a spectrogram of the response signal; and
authenticate the authentication subject, by using the spectrogram of the transfer characteristic.

5. A biometric authentication method comprising:
by a biometric authentication device,
receiving a response signal from a client device, the response signal being a signal in which a probe signal changed by being transmitted through a body or on a surface of the body of an authentication subject, the probe signal being a signal applied to the authentication subject by the client device,
generating a same probe signal as the probe signal applied by the client device;
calculating a transfer characteristic of the authentication subject using the generated probe signal and the response signal; and
authenticating the authentication subject by comparing a previously registered transfer characteristic and the calculated transfer characteristic,
wherein the probe signal is configured of a pattern, a frequency of which changes over time, and
by a client device,
replaying the probe signal;
outputting the replayed probe signal toward the authentication subject;
measuring the response signal from the authentication subject; and
transmitting the response signal measured to the biometric authentication device, wherein
the biometric authentication device further performs operation to receive the response signal,
the client device and the biometric authentication device each store information on a previously registered transfer characteristic,
first authentication related to the authentication subject is performed by the client device, based on the previously registered transfer characteristic and the response signal measured, and
second authentication related to the authentication subject is performed by the biometric authentication device.

6. A non-transitory computer-readable recording medium that stores a biometric authentication program for causing a biometric authentication device and a client device to execute:
receiving a response signal from a client device, the response signal being a signal in which a probe signal changed by being transmitted through a body or on a surface of the body of the authentication subject, the probe signal being a signal applied to the authentication subject by the client device,
generating a same probe signal as the probe signal applied by the client device,
calculating a transfer characteristic of the authentication subject using the generated probe signal and the response signal, and
authenticating the authentication subject by comparing a previously registered transfer characteristic and the calculated transfer characteristic,
wherein the probe signal is configured of a pattern, a frequency of which changes over time, and
by the client device;
replaying the probe signal,
outputting the replayed probe signal toward the authentication subject;
measuring the response signal from the authentication subject; and
transmitting the response signal measured to the biometric authentication device, wherein
the biometric authentication device further performs operation to receive the response signal,
the client device and the biometric authentication device each store information on a previously registered transfer characteristic,
first authentication related to the authentication subject is performed by the client device, based on the previously registered transfer characteristic and the response signal measured, and
second authentication related to the authentication subject is performed by the biometric authentication device.

* * * * *